(12) United States Patent
Madaiah et al.

(10) Patent No.: US 10,117,109 B2
(45) Date of Patent: Oct. 30, 2018

(54) SYSTEM AND METHOD FOR DETERMINING OPTIMAL PLACEMENT OF TELECOMMUNICATION EQUIPMENT

(71) Applicant: Tejas Networks, Ltd., Karnataka (IN)

(72) Inventors: Vinod Kumar Madaiah, Karnataka (IN); Rohith C Aralikatti, Karnataka (IN)

(73) Assignee: Tejas Networks, Ltd., Karnataka (IN)

(*) Notice: Subject to any disclaimer, the term of this patent is extended or adjusted under 35 U.S.C. 154(b) by 0 days.

(21) Appl. No.: 15/239,702

(22) Filed: Aug. 17, 2016

(65) Prior Publication Data

US 2017/0054607 A1 Feb. 23, 2017

(30) Foreign Application Priority Data

Aug. 18, 2015 (IN) .......................... 4308/CHE/2015

(51) Int. Cl.
*H04W 16/18* (2009.01)
*G06N 5/00* (2006.01)
*G06N 3/08* (2006.01)
*H04L 12/24* (2006.01)

(52) U.S. Cl.
CPC .......... *H04W 16/18* (2013.01); *G06N 3/086* (2013.01); *G06N 5/003* (2013.01); *H04L 41/5006* (2013.01); *H04L 41/5041* (2013.01); *H04L 41/12* (2013.01)

(58) Field of Classification Search
CPC ................................................... H04W 16/18
See application file for complete search history.

(56) References Cited

U.S. PATENT DOCUMENTS

| | | | | |
|---|---|---|---|---|
| 7,385,936 B2* | 6/2008 | Shipman | ............... | H04L 41/145 370/252 |
| 2003/0181210 A1* | 9/2003 | Shipman | ............... | H04L 41/145 455/446 |
| 2004/0260813 A1* | 12/2004 | Heisserman | ........... | G06Q 10/04 709/226 |
| 2013/0196676 A1* | 8/2013 | Koudouridis | ......... | H04W 72/04 455/452.1 |
| 2014/0057627 A1* | 2/2014 | Hejazi | ................... | H04W 28/08 455/424 |

* cited by examiner

*Primary Examiner* — Charles Appiah
*Assistant Examiner* — Frank Donado
(74) *Attorney, Agent, or Firm* — Maxwell J. Petersen; Lewis Brisbois Bisgaard & Smith LLP

(57) ABSTRACT

Aspects of the present disclosure provide systems and methods for determining placement of telecommunication equipment so as to minimize network cost, maximize network utilization, and meet Service Level Agreements (SLA) for the given network topology and demand requirements. Systems and methods of the present disclosure can be configured to determine minimum number of telecommunication equipment and placement thereof by constructing, based on a given network topology and service requirement, using a heuristic algorithm, an initial population of possible solutions, iterating over the possible solutions to increase optimality of solution based on any or a combination of cost of placement of the one or more telecommunication equipment and number of telecommunication equipment to be placed, and identifying most optimal solution for the placement of the one or more telecommunication equipment.

9 Claims, 4 Drawing Sheets

SYSTEM AND METHOD FOR DETERMINING OPTIMAL PLACEMENT OF TELECOMMUNICATION EQUIPMENT

TECHNICAL FIELD

The present disclosure generally relates to network planning and placement of network devices. The present disclosure more particularly relates to a system and method for determining optimal location(s) for placement of telecommunication equipment in a network.

BACKGROUND

Background description includes information that may be useful in understanding the present invention. It is not an admission that any of the information provided herein is prior art or relevant to the presently claimed invention, or that any publication specifically or implicitly referenced is prior art.

Setting up a telecommunication network and/or computer network requires intense study and planning for placement of different telecommunication equipment or network devices. Strategic positioning of telecommunication equipment or network devices can provide optimal performance to the network without increasing much of capital investment in setting up the network and maintaining the network. For example, in order to set-up an efficient telecommunication network, it is required that the planning system, which help plan the network, identifies telecommunication equipment that need to be placed, how many such equipment are needed to be placed and locations at which they are to be placed. The network should be planned and network devices or telecommunication equipment need to be placed at strategic locations depending on bandwidth requirements, number of estimated users, suggested network topology, among other network and performance parameters. Each network needs to be planned and network equipment need to be placed at strategic locations to serve maximum number of users or provide maximum coverage. As network requirements vary, different topologies are required for implementation, and hence different locations for network devices/telecommunication equipment are expected. This requires customized and specific solutions for different networks having varying complexities that use different topologies and have different service demands. Adding each network device/telecommunication equipment to a network increases the cost of set-up and maintenance of the networks, and therefore generic planning and placement for different types of network scenarios to set-up networks with large number of network devices/telecommunication equipment, is not advisable. At the same time, the network also needs to ensure that there are enough telecommunication equipment and none of the network devices/telecommunication equipment are overburdened.

An optimal network design should use minimum number of network devices/telecommunication equipment and place these network devices/telecommunication equipment at strategic locations for achieving maximum utilization, and for serving maximum number of connected devices. This requires solution for planning an optimal network and determining placement of network devices/telecommunication equipment for optimal performance of telecommunication network. Similar solutions are also required for setting up a computer network and determining placement of telecommunication devices for the network. It has been observed that strategic locations for different network devices or telecommunication equipment help in reducing the number of network devices/telecommunication equipment required in a network. There is therefore a need for systems and methods for determining optimal locations/positions of placement of different network devices or telecommunication equipment.

Prior art solutions provide several tools for designing a new network. However the problem of determining strategic locations for new network devices/telecommunication equipment has not been adequately addressed. With the number of users within a network increasing, or periodic modifications being made in the network, new nodes and/or network devices and/or telecommunication equipment need to be added in the network at run time, and therefore placement of new telecommunication equipment needs to be determined/estimated with high accuracy.

There are different factors that may influence determination of location for placement of network devices or telecommunication equipment. In order to create a network, a number of different parameters such as topology of the network, description of each of the relevant sites within the network, and connectivity and bandwidth requirements between these sites, need to be provided. These parameters are processed for determining location/position of network devices or telecommunication equipment. None of existing solutions are able to determine optimal placements for one or more telecommunication equipment or network devices based on different input constraints, such as network topology, SLA, demand matrix, among others.

Accordingly, systems and methods are required for addressing the above-described deficiencies within prior-art network planning and equipment deployment solutions. There also exists a need for systems and methods for determining strategic placement of network devices and/or telecommunication equipment in a network.

OBJECTS OF THE INVENTION

An object of the present disclosure is to provide a system and method for determining strategic locations of one or more network device(s) and/or telecommunication equipment.

An object of the present disclosure is also to provide a system and method for creating a network design.

Another object of the present disclosure is to provide a system and method for determining placement of network device(s) or telecommunication equipment for different network topologies.

Yet another object of the present disclosure is to provide a system and method for determining placement of a network device and/or a telecommunication equipment based on one or more network parameters and one or more service requirements.

An object of the present disclosure is to provide a system and method for creating a network design with minimum number of network devices or telecommunication equipment.

Another object of the present disclosure is to provide a system and method for determining placement of network devices so as to minimize network cost, maximize network utilization, and meet Service Level Agreements (SLA) defined based on network topology and demand requirements.

SUMMARY

Aspects of the present disclosure relate to systems and methods for determining placement of a telecommunication equipment based on given network parameters and service requirements of the network. An aspect of the present disclosure provides systems and methods for determining placement of telecommunication equipment so as to minimize network cost, maximize network utilization, and meet Service Level Agreements (SLA) for a given network topology and demand requirements. Systems and methods of present disclosure can be configured to determine minimum number of telecommunication equipment that are/may be required to fulfill the given constraints that include network parameters and service requirements, and determine strategic locations of different telecommunication equipment so as to minimize the network cost.

In an aspect, the present disclosure relates to a method for determining placement of one or more telecommunication equipment, wherein the method can include steps of constructing, based on a given network topology and service requirement, using a heuristic algorithm, an initial population of possible solutions, wherein each solution of the possible solutions comprises information relating to deployment of the one or more telecommunication equipment as well as the set of paths over which traffic has been routed. The method can further include the step of iterating over the possible solutions to increase optimality of solutions based on any or a combination of cost of placement of the one or more telecommunication equipment and number of telecommunication equipment to be placed. The method can further include the step of identifying most optimal solution for the placement of the one or more telecommunication equipment based on outcome of the iterations.

In an exemplary implementation, heuristic algorithm used for determining placement of the network device can be any or a combination of a genetic algorithm, a simulated annealing, Ant Colony Optimization, Tabu Search, among other similar evolutionary algorithms.

In an aspect, the present disclosure relates to a method for determining placement of one or more telecommunication equipment based on a genetic algorithm approach, wherein the method can include the step of constructing, based on a given network topology and service requirement, using a genetic algorithm, an initial population of possible solutions that are each encoded as a chromosome consisting of at least one gene, wherein each solution of the possible solutions comprises information relating to deployment of the one or more telecommunication equipment as well as the set of paths over which traffic has been routed. The method can further include the step of iteratively performing crossover and/or mutation operations of the chromosomes (each chromosome, consisting of at least one gene, being encoded representation of a corresponding possible solution) to increase optimality of the chromosomes, based on any or a combination of cost of placement of the one or more telecommunication equipment and number of telecommunication equipment to be placed as well as the length of the paths over which traffic is routed. The method can further include the step of identifying most optimal chromosome as final solution for the placement of the one or more telecommunication equipment. As one will appreciate, each possible solution can be represented as a chromosome, and characteristics of such chromosomes would be similar to characteristics of telecommunication equipment if placed based on any of the possible solution(s).

In an aspect, the present disclosure further relates to a system that is configured to determine placement of one or more telecommunication equipment, wherein the system can include a genetic algorithm based possible solution(s) determination module that can be configured to generate an initial population of possible solutions that satisfies one or more input constraints. System of the present disclosure can further include a possible solution(s) encoding and chromosome creation module that can be configured to encode each solution of the possible solutions to generate a corresponding chromosome. System of the present disclosure can further include a crossover based iteration module that can be configured to iteratively perform crossover operation by selecting two chromosomes, exchanging features of the two chromosomes to obtain daughter chromosomes. System can further include a mutation based iteration module that can be configured to iteratively perform mutation operation by selecting a chromosome from the initial population, and mutating the selected chromosome to obtain a new chromosome that replaces less optimal members of the initial population of possible solutions. If necessary, mutation can also be applied to the two chromosomes selected for crossover, prior to or after crossover. System can further include a genetic algorithm based optimal solution determination module that can be configured to identify most optimal chromosome as final solution for placement of the one or more telecommunication equipment.

In an embodiment, genetic algorithm based possible solution determination module can be configured to construct, using a genetic algorithm, an initial set of possible solutions based on given input constraints that can include network parameters/specification (such as network topology, for instance) and service requirements, wherein each solution of the possible solutions can include information relating to possible deployment of the one or more telecommunication equipment as well as the set of paths over which traffic is being routed. In an aspect, each of these possible solutions can be represented or encoded as chromosomes by the possible solution(s) encoding chromosome creation module for further processing by a crossover based iteration module, and/or by mutation based interaction based module.

In an exemplary implementation, two or more of the plurality of chromosomes can be selected in a random manner and/or in predefined manner for further processing by the crossover based iteration module, which can be configured to iteratively perform crossover operation by exchanging features of the two selected chromosomes to obtain daughter chromosomes as additional possible solutions, and enabling the daughter chromosomes to replace less optimal members of the population of possible solutions. In an exemplary implementation, crossover based iteration module can be configured to select one or more chromosomes in a predefined manner or in a random manner.

In another implementation, mutation based iteration module can be configured to iteratively perform mutation operation by selecting a chromosome from the initial population, and mutating the selected chromosome to obtain a new chromosome that replaces less optimal members of the initial population of possible solutions. In an exemplary implementation, number of iterations for processing the chromosomes by the crossover based iteration module and by mutation based iteration module can be fixed, or the modules can be recessively perform their operation until optimal chromosomes are determined.

In an exemplary implementation, genetic algorithm based optimal solution determination module can be configured to identify the most optimal chromosome as final solution for placement of the one or more telecommunication equipment. Systems and methods of present disclosure can be used for determining placement of one or more telecommunication equipment such as any or a combination of Wavelength Division Multiplexing (WDM) devices, Reconfigurable Optical Add Drop Multiplexer (ROADM) devices, Digital Cross connects, Amplifiers, Regulators, Odd/Even Multiplexers, Power Splitters, Transceivers, Variable Optical Attenuator (VOA), Optical Transport Network (OTN) Cross connects, Power supply, Optical Supervisory Channel (OSC), Optical Cross Connect (OXC), and other telecommunication devices.

It is also to be appreciated that although the present embodiments have been explained with reference to telecommunication equipment, such reference is completely exemplary, and any other network device or configurable computing device can be evaluated in the same manner for its/their respective placement in a network, all of which is completely within the scope of the present disclosure. Therefore, embodiments of the present disclosure can also be used for determining placement of network devices such wireless access points, routers, switches, gateway devices, network security devices, among others that are configured in a typical network.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION

Figure 1:
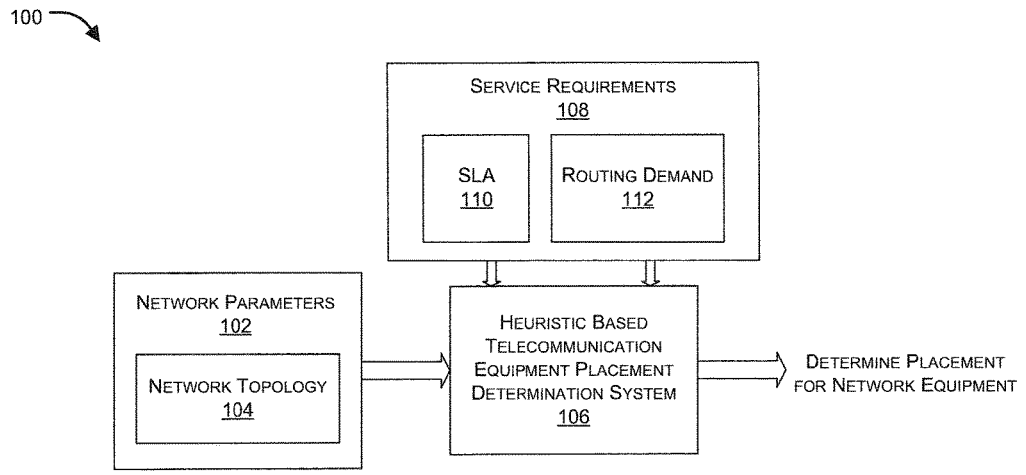
FIG. 1 illustrates an exemplary block diagram representing the input and output of a heuristic based telecommunication equipment placement determination system in accordance with an embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Aspects of the present disclosure relate to systems and methods for determining placement of a telecommunication equipment based on given network parameters and service requirements of the network. An aspect of the present disclosure provides systems and methods for determining placement of telecommunication equipment as well as the set of paths along which traffic is routed so as to minimize network cost, maximize network utilization, and meet Service Level Agreements (SLA) for a given network topology and demand requirements. Systems and methods of present disclosure can be configured to determine minimum number of telecommunication equipment that are/may be required to fulfill the given constraints that include network parameters and service requirements, and determine strategic locations of different telecommunication equipment so as to minimize the network cost.

In an aspect, the present disclosure relates to a method for determining placement of one or more telecommunication equipment, wherein the method can include steps of constructing, based on a given network topology and service requirement, using a heuristic algorithm, an initial population of possible solutions, wherein each solution of the possible solutions comprises information relating to deployment of the one or more telecommunication equipment. The method can further include the step of iterating over the possible solutions to increase optimality of solutions based on any or a combination of cost of placement of the one or more telecommunication equipment and number of telecommunication equipment to be placed. The method can further include the step of identifying most optimal solution for the placement of the one or more telecommunication equipment based on outcome of the iteration.

In an exemplary implementation, heuristic algorithm used for determining placement of the network device can be any or a combination of a genetic algorithm, a simulated annealing, Ant Colony Optimization, Tabu Search, among other similar evolutionary algorithms.

In an aspect, the present disclosure relates to a method for determining placement of one or more telecommunication equipment based on a genetic algorithm approach, wherein the method can include the step of constructing, based on a given network topology and service requirement, using a genetic algorithm, an initial population of possible solutions that are each encoded as a chromosome, wherein each solution of the possible solutions comprises information relating to deployment of the one or more telecommunication equipment. The method can further include the step of performing iteratively crossover and mutation of the chromosomes (each chromosome being encoded representation of a corresponding possible solution) to increase optimality of the chromosomes, based on any or a combination of cost of placement of the one or more telecommunication equipment and number of telecommunication equipment to be placed. The method can further include the step of identifying most optimal chromosome as final solution for the placement of the one or more telecommunication equipment. As one will appreciate, each possible solution can be represented as a chromosome, and characteristics of such chromosomes would be similar to characteristics of telecommunication equipment if placed based on any of the possible solution(s).

In an aspect, the present disclosure further relates to a system that is configured to determine placement of one or more telecommunication equipment, wherein the system can include a genetic algorithm based possible solution(s) determination module that can be configured to generate an initial population of possible solutions that satisfies one or more input constraints. System of the present disclosure can further include a possible solution(s) encoding and chromosome creation module that can be configured to encode each solution of the possible solutions to generate a corresponding chromosome. System of the present disclosure can further include a crossover based iteration module that can be configured to iteratively perform crossover operation by selecting two chromosomes, exchanging features of the two chromosomes to obtain daughter chromosomes. System can further include a mutation based iteration module that can be configured to iteratively perform mutation operation by selecting a chromosome from the initial population, and mutate the selected chromosome to obtain a new chromosome that replaces less optimal members of the initial population of possible solutions. System can further include a genetic algorithm based optimal solution determination module that can be configured to identify most optimal chromosome as final solution for placement of the one or more telecommunication equipment.

In an embodiment, genetic algorithm based possible solution determination module can be configured to construct, using a genetic algorithm, an initial set of possible solutions based on given input constraints that can include network parameters/specification (such as network topology, for instance) and service requirements, wherein each solution of the possible solutions can include information relating to possible deployment of the one or more telecommunication equipment. In an aspect, each of these possible solutions can be represented or encoded as chromosomes by the possible solution(s) encoding chromosome creation module for further processing by a crossover based iteration module, and/or by mutation based interaction based module.

In an exemplary implementation, two or more of the plurality of chromosomes can be selected in a random manner and/or in predefined manner for further processing by the crossover based iteration module, which can be configured to iteratively perform crossover operation by exchanging features of the two selected chromosomes to obtain daughter chromosomes as additional possible solutions, and enabling the daughter chromosomes to replace less optimal members of the population of possible solutions. In an exemplary implementation, crossover based iteration module can be configured to select one or more chromosomes in a predefined manner or in a random manner.

In another implementation, mutation based iteration module can be configured to iteratively perform mutation operation by selecting a chromosome from the initial population, and mutating the selected chromosome to obtain a new chromosome that replaces less optimal members of the initial population of possible solutions. In an exemplary implementation, number of iterations for processing the chromosomes by the crossover based iteration module and by mutation based iteration module can be fixed, or the modules can recessively perform their operation until optimal chromosomes are determined.

In an exemplary implementation, genetic algorithm based optimal solution determination module can be configured to identify the most optimal chromosome as final solution for placement of the one or more telecommunication equipment. Systems and methods of present disclosure can be used for determining placement of one or more telecommunication equipment such as any or a combination of Wavelength Division Multiplexing (WDM) devices, Reconfigurable Optical Add Drop Multiplexer (ROADM) devices, Digital Cross connects, Amplifiers, Regulators, Odd/Even Multiplexers, Power Splitters, Transceivers, Variable Optical Attenuator (VOA), OTN Cross connects, Power supply, Optical Supervisory Channel (OSC), Optical Cross Connect (OCC or OXC) and other telecommunication devices.

It is also to be appreciated that although the present embodiments have been explained with reference to telecommunication equipment, such reference is completely exemplary, and any other network device or configurable computing device can be evaluated in the same manner for its/their respective placement in a network, all of which is completely within the scope of the present disclosure. Therefore, embodiments of the present disclosure can also be used for determining placement of network devices such wireless access points, routers, switches, gateway devices, network security devices, among others that are configured in a typical network. For example, services or demands of lower speed can be groomed or aggregated at higher packet layers (e.g. Layer 2 or Layer 3 of ISO-OSI Layer) to a speed that a wavelength can support and a suitable device for such aggregation can be computed and placed for optimizing the network.

FIG. 1 illustrates an exemplary block diagram 100 representing input and output of a heuristic based telecommunication equipment placement determination system in accordance with an embodiment of the present disclosure. In an aspect, a heuristics based telecommunication equipment placement determination system 106 can be configured to determine placement of one or more telecommunication equipment or network devices. As shown in FIG. 1, heuristics based telecommunication equipment placement determination system 106 can be configured to receive one and combination of network parameters 102 and service requirements 108 as input constraints, and determine placement of one or more telecommunication equipment(s) or network device(s) in a network based on such constraints.

In an aspect, network parameters 102 can include, but are not limited to, suggested network topology 104 information, preferred placement of the telecommunication equipment, suggested number of telecommunication equipment, and connectivity information. Similarly, service requirement 108 can, without any limitation, include SLA 110, routing demand 112 (also referred to as demand matrix), bandwidth information, service routes, capital expenditure cap, operating expenditure cap, service requirement information, bandwidth requirement between different connected devices, protection types for each service, demand matrix, among any other additional/like constraints.

In an exemplary implementation, network parameters and/or service requirements along with other constraints can be provided as input by a network administrator who needs to plan the deployment of one or more telecommunication equipment. The user can mark one or more of these constraints as mandatory and other constraints as optional. In an exemplary implementation, placement of telecommunication equipment, as determined by the system 106, can be configured to at-least satisfy one or more configured/defined mandatory constraints.

In an aspect, heuristics based telecommunication equipment placement determination system 106 can be configured to determine location(s)/position(s) for placement of one or more telecommunication equipment(s) so as to minimize network cost, maximize network utilization, and meet other constraints that are provided as input to the proposed system 106. In an aspect, system 106 can be further configured to attempt to satisfy different performance parameters and meet maximum constraints. In an exemplary implementation, system 106 of the present disclosure can be configured to strictly satisfy some of the selected constraints such as routing demand, network topology, and SLA. System 106 further may need to ensure that some of the constraints are fully satisfied, while other may be optionally satisfied.

In an exemplary implementation, system 106 of the present disclosure can determine location/position for placement of one or more telecommunication equipment by minimizing overall network cost, which may be factor in location of placement of telecommunication equipment, servicing routes, number of devices served, installation cost of the telecommunication equipment(s), maintenance cost of the telecommunication equipment(s), and other associated network cost factors. One or more telecommunication equipment can be placed strategically to minimize overall network cost. Using the heuristic algorithm, system 106 can determine optimal solution for placement of telecommunication equipment and ensure routing demand in a network for the given constraints, and minimize the network cost.

In an exemplary implementation, the proposed system 106 can be used to determine the best suitable location for placement of particular telecommunication equipment in an existing network. In an exemplary implementation, system 106 can be used to determine most suitable location for placement of one or more telecommunication equipment(s) while designing a new network or making modification of the existing network so as to minimize overall network cost.

In an exemplary implementation, system 106 of the present disclosure can be configured to use a heuristic algorithm for determining a plurality of potential solutions, where different solutions represent different possible placements of one or more telecommunication equipment. The plurality of potential solutions can further be processed to determine an optimal solution where placement of the one or more telecommunication equipment at identified locations provides minimum network cost. Different implementations can use different heuristics such as simulated annealing, Ant Colony Optimization, Tabu Search, among any other evolutionary algorithm. In a preferred embodiment, system 106 can be configured to use genetic algorithm that provides several advantages, wherein using genetic algorithm, possible solutions get optimal with each iteration and/or generation of evolution, based on which the system 106 can finally determine the most optimal solution. Genetic algorithm based system for determining placement of one or more telecommunication equipment provides flexibility of selecting level of optimization. In an exemplary implementation, for a given requirement/constraint of the network, it is possible to achieve any level optimality by controlling population size and number of generations. Such flexibility by genetic algorithm based system provides freedom to network designer, who may not want a best solution at the time of network set-up but an optimal solution so to keep unforeseen future requirements into consideration.

In an aspect, system 106 can be configured to determine placement of one or more telecommunication equipment and can provide cost effective solution for setting up a network, wherein the system 106 can provide an optimal network deployment that uses least number of telecommunication equipment. In an exemplary implementation, system 106 can be configured to reduce the total number of wavelength division multiplexing (WDM's) that are implemented. Embodiments of the present disclosure can also be used to determine optimal number of components or capacity of each telecommunication equipment to be placed in a network at a determined location. Solution offered by the proposed system 106 can also ensure that each telecommunication equipment uses as few components as possible. For instance, system 106 can ensure minimum number of components such as ROADM, amplifier, variable optical attenuator (VOA), and other internal components used in a WDM.

In an exemplary implementation, system 106 can be configured to determine placement of any of the components including but not limiting to a Wavelength Division Multiplexing (WDM) device, Reconfigurable Optical Add Drop Multiplexer (ROADM), Digital Cross connects, Amplifiers, Regulators, Odd/Even Multiplexers, Power Splitters, Transceivers, VOA, OTN Cross connects, Power supply, OSC, OXC, etc.

One should appreciate that reduced number of telecommunication equipment and reduced number of components in any telecommunication equipment can lead to low power consumption, and hence reduce the maintenance cost of the network. A network having lesser number of components in telecommunication equipment, and lesser number of telecommunication equipment in the network has lesser number of component failures/network failure points. In case of network failure (i.e one or more links or WDM's fail), low system complexity (network complexity is low because of fewer components) allows network management software to easily find other paths to route traffic affected by the failure. Even reducing network complexity by a small fraction is extremely beneficial as certain service demands have Type 1 Protection, which means that the traffic must be rerouted within 50 milliseconds of network failure.

Figure 2:
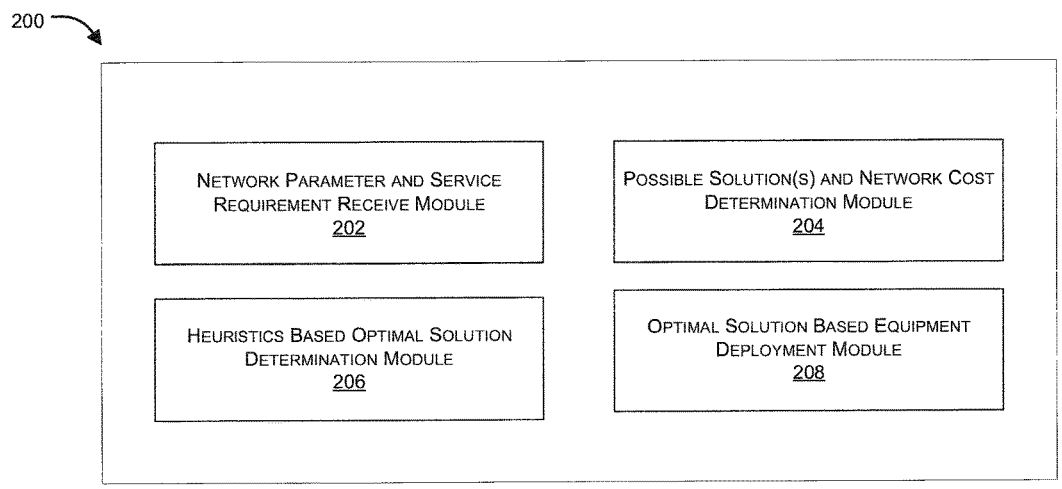
FIG. 2 illustrates an exemplary module diagram of heuristic based telecommunication equipment placement determination system in accordance with an embodiment of the present disclosure.

FIG. 2 illustrates an exemplary module diagram of heuristic based telecommunication equipment placement determination system 200 in accordance with an embodiment of the present disclosure. The heuristics based telecommunication equipment placement determination system 200 can include network parameter and service requirement receive module 202 that can be configured to receive network parameters and service requirements from a user/system, a possible solution(s) and network cost determination module 204 that can be configured to determine possible solutions based on a selected heuristics algorithm and determine network cost for each of the possible solutions, a heuristic based optimal solution determination module that can be configured to determine optimal solution so as to minimize network cost of each solution, and an optimal solution based equipment deployment module 208 that can be configure to finalize placement of one or more telecommunication equipment in a network. In an aspect, heuristic based telecommunication equipment placement determination system 200 can determine optimal number of telecommunication equipment to be placed and strategic locations of such telecommunication equipment in the network so as to minimize the network cost.

In an example implementation, network parameter and service requirement receive module 202 can be configured to receive different constraints such as network parameters and service requirements related to a network from a user through a user interface. The network parameters may include but are not limited to network topology, preferred placement of the telecommunication equipment, suggested number of telecommunication equipment, and connectivity information. Similarly, the service requirements can include, but are not limited to, SLA, routing demand (also referred as demand matrix), bandwidth information, service routes, capital expenditure, operating expenditure, service requirement information, bandwidth requirement between different connected devices, protection types for each service, demand, and any other additional constraints. In an exemplary implementation, network parameters and service requirement receive module 202 can receive plurality of constraints and other desired network parameters from the user/network planner. The user can, in an aspect, mark one or more of these constraints as mandatory and other constraints as optional.

After receiving different constraints, system 200 of the present disclosure can use select an appropriate heuristic algorithm for determining optimal solution from a plurality of possible initial solutions, each solution representing, for instance, number of different telecommunication equipment required and placement of such equipment at different locations. In an exemplary implementation, possible solutions(s) and network cost determination module 204 can be configured to use a selected heuristic algorithm for determining optimal solution from a plurality of possible solution (s), which may be sub-optimal solutions and further to determine network cost associated with each possible solution. In an aspect, heuristics algorithm used by the module 204 can include, but is not limited to, simulated annealing, ant colony optimization, Tabu search, and among other evolutionary algorithms. In an aspect, module 204 can be configured to determine plurality of possible solutions, each of which individually satisfies one or more input constraints or at-least the mandatory input constraints. Once the plurality of possible solutions are determined, module 204 can determine the network cost associated with each of the plurality of possible solutions. In an exemplary implementation, network cost can be calculated based on several factors such as placement of telecommunication equipment, servicing routes, number of devices served, capital expenditure, operating expenditure, service requirement, among other associated constraints.

In an exemplary implementation, heuristic based optimal solution determination module 206 can be configured to determine an optimal solution by applying different combinations of possible solutions. Module 206 can be configured to execute the heuristic algorithm iteratively for determining the optimal solution for placement of one or more telecommunication equipment. In an aspect, module 206 can be configured to try combinations of different possible solutions as determined by the module 204. In an exemplary implementation, module 206 can be configured to be execute iteratively/recessively for fixed number of times. In another exemplary implementation, module 206 can be configured to be execute iteratively until an optimal solution having network cost equal to or below a threshold is determined. Module 206 can further be configured to calculate network cost for solutions at different iterations, and solutions for which the network cost in minimum, can be termed as the optimal solution. An optimal solution therefore provides a number of different telecommunication equipment that need to be configured/placed/deployed along with indicating the location of deployment of each equipment in a manner that enables minimum network cost. In an alternative implementation, it is possible that the optimal solution, as obtained by the heuristic based optimal solution determination module 206, is not the one that has minimum network cost keeping in view the potential foreseen capacity requirements but is optimal keeping most parameters in context.

In an exemplary implementation, optimal solution based equipment deployment module 208 can be configured to deploy one or more telecommunication equipment at determined locations based on an optimal solution as determined by the heuristics based optimal solution module 206. In an exemplary embodiment, system 200 can be configured to determine location(s)/position(s) for placement of one or more telecommunication equipment so as to minimize the network cost, maximize network utilization, and/or meet other defined constraints that were provided as input. System 200 of the present disclosure also attempts to satisfy different performance parameters and meet maximum constraints as provided by the user.

In an aspect, one or more telecommunication equipment can be placed strategically to minimize overall network cost. Using an heuristic algorithm, telecommunication equipment placement determination system 200 can determine placement of telecommunication equipment and ensure that routing demand in a network is met.

In an aspect, system 200 of the present disclosure provides an optimal network deployment that uses least number of telecommunication equipment. In an exemplary implementation, system 200 can be configured to determine placement of any of the components such as Wavelength Division Multiplexing (WDM), Reconfigurable Optical Add Drop Multiplexer (ROADM), Digital Cross connects, Amplifiers, Regulators, Odd/Even Multiplexers, Power Splitters, Transceivers, VOA, OTN Cross connects, Power supply, OSC, OXC, etc.

In an exemplary implementation, heuristic algorithm used for determining placement of one or more telecommunication equipment can include genetic algorithm, or simulated annealing, ant colony optimization, tabu search, among and other evolutionary algorithms and heuristic algorithms.

Figure 3:
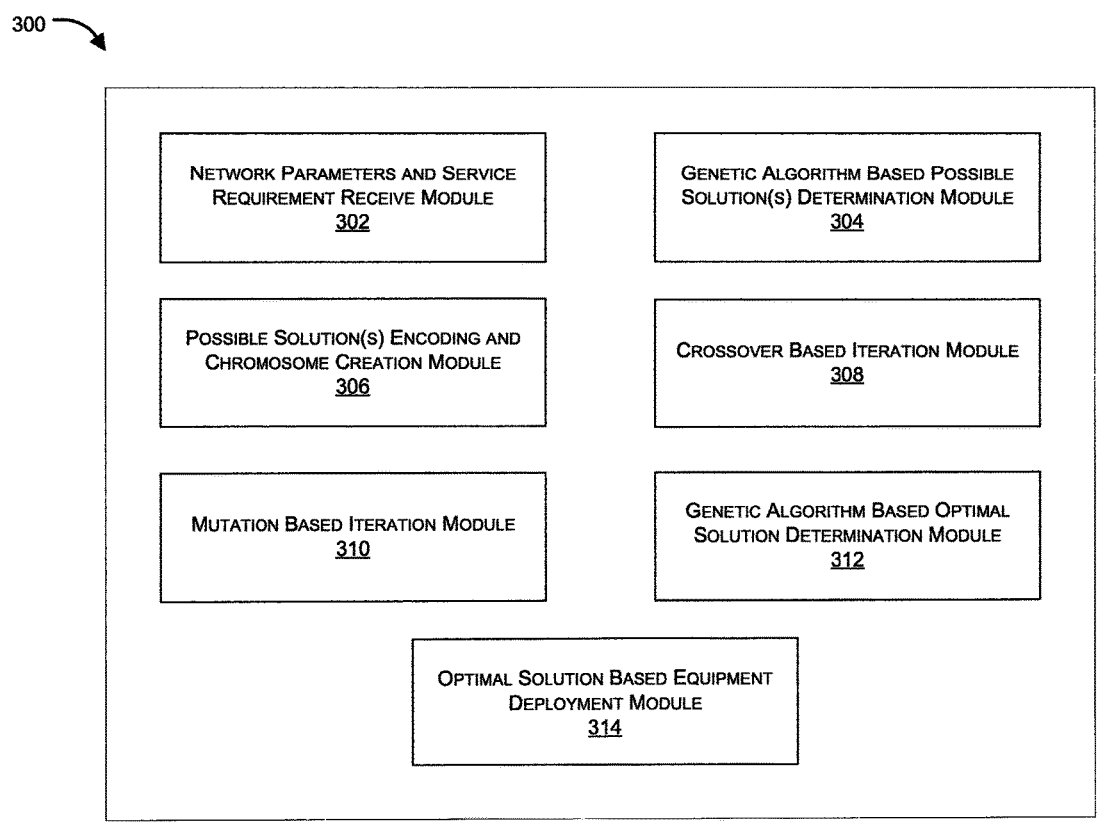
FIG. 3 illustrates an exemplary module diagram of a genetic algorithm based telecommunication equipment placement determination system in accordance with an embodiment of the present disclosure.

FIG. 3 illustrates an exemplary module diagram of a genetic algorithm based telecommunication equipment placement determination system 300 in accordance with an embodiment of the present disclosure. In an embodiment, genetic algorithm can be used for determining placement of one or more telecommunication equipment in a network. In an exemplary implementation, genetic algorithm based telecommunication equipment placement determination system 300 can include a network parameters and service requirement receive module 302 that can be configured to receive different constraints from users/systems, a genetic algorithm based possible solution(s) determination module 304 that can be configured to generate an initial population of possible solutions, a possible solution(s) encoding and chromosome creation module 306 that can be configured to encode each solution of the possible solutions to generate a corresponding chromosome, a crossover based iteration module 308 that can be configured to iteratively perform crossover operation by selecting two chromosomes and exchanging features of the two chromosomes to obtain daughter chromosomes, a mutation based iteration module 310 that can be configured to iteratively perform mutation operation by selecting a chromosome from the initial population and mutating the selected chromosome to obtain a new chromosome that replaces less optimal members of the initial population of possible solutions, and a genetic algorithm based optimal solution determination module 312 that can be configured to identify most optimal chromosome as final solution for the placement of the one or more telecommunication equipment.

One can appreciate that network parameters and service requirement receive module 302 can be configured to receive different constraints such as network parameters/ specifications and service requirements from one or more users/systems through an appropriate user interface attached with the system 300. In an embodiment, genetic algorithm based possible solution determination module 304 can be configured to construct, using a genetic algorithm, an initial set of possible solutions based on given network parameters/specifications and service requirements, wherein each solution of the possible solutions can include information relating to possible deployment of the one or more telecommunication equipment. The genetic algorithm based possible solution determination module 304 can further be configured to generate plurality of solutions, each satisfying the input constraints or at-least the mandatory constraints. Network cost associated with each of the possible solutions can be calculated and the system 300 can use other modules to optimize the possible solutions. In an example implementation, each of these possible solutions can be represented or encoded as chromosomes by the possible solution(s) encoding chromosome creation module 306, which include different characteristics of solutions, placement of one or more telecommunication equipment, bandwidth of different connections, capacity of the network equipment, among other attributes. Each chromosome can be include at least one gene. The possible solution(s) encoding and chromosome creation module 306 can further include properties of one or more telecommunication equipment as properties of the chromosomes.

In an exemplary implementation, chromosomes that are encoded versions of the different possible solutions can be processed by a crossover based iteration module 308 and/or by a mutation based iteration based module 310. In an exemplary implementation, two or more of the plurality of chromosomes, created by possible solution(s) encoding chromosome creation module 306, can be selected in a random manner and/or in a predefined manner for further processing by the crossover based iteration module 308, wherein the module 308 can be configured to iteratively perform crossover operation, exchange features of the two chromosomes to obtain daughter chromosomes as additional possible solutions, and enable the daughter chromosomes to replace less optimal members of the population of possible solutions. In an exemplary implementation, crossover based iteration module 308 can be configured to select one or more chromosomes in a predefined manner or in a random manner for performing crossover operation. In an aspect, crossover of two chromosomes/solutions can produce more optimal solutions with each iteration.

In another aspect, the chromosomes can be processed by the mutation based iteration module 310, which can iteratively perform mutation operation by selecting a chromosome from the initial population and mutating the selected chromosome to obtain a new chromosome that replaces (if possible) less optimal members of the initial population of possible solutions. In an exemplary implementation, number of iterations for processing the chromosomes by the crossover based iteration module 308 and mutation based iteration module 310 can be fixed or can be recessively performed until optimal chromosomes/solutions are determined.

In an exemplary implementation, a genetic algorithm based optimal solution determination module 312 can be configured to identify most optimal chromosome as final solution for placement of one or more telecommunication equipment. In an exemplary implementation, module 312 can select the most optimal solution from the plurality of solutions based on the minimum network cost. In an aspect, after determining the optimal solution that represents the number of telecommunication equipment to be placed, along with deployment location of these telecommunication equipment, optimal solution based equipment deployment module 314 can be configured to place/configure/deploy one or more telecommunication equipments at the determined locations.

Although different implementations in the present disclosure have been described with reference to an optimal solution for determining number different telecommunication equipment and placement thereof, teachings of present disclosure can also be used for determining number of components used for assembling a particular equipment or network device and/or for determining placement of such components. Furthermore, system of present disclosure can also be used for determining placement of different network devices for setting up a secured computer network. In an exemplary embodiment, placement of different network devices can be determined using modules of present disclosure.

Figure 4:
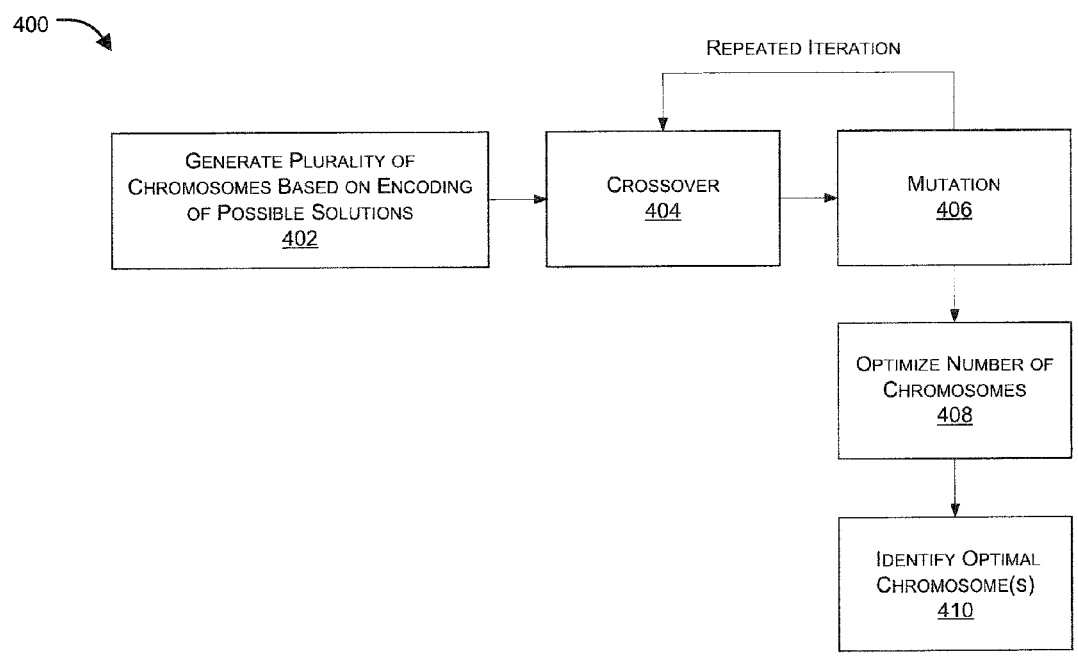
FIG. 4 illustrates exemplary steps for determining the location for placement of network device in accordance with an embodiment of the present disclosure.

FIG. 4 illustrates exemplary steps 400 for determining location for placement of telecommunication/network devices in accordance with an embodiment of the present disclosure. Steps for determining location for placement of telecommunication equipment, as shown in FIG. 4, can be based on use of a genetic algorithm. In an exemplary implementation, genetic algorithm based telecommunication equipment placement determination system can be configured to generate a plurality of chromosomes (each having at least one gene) based on encoding of possible solutions as shown in block 402. In an aspect, chromosomes are encoded representations of corresponding/respective possible solutions that have been obtained using the proposed genetic algorithm based on the given input constraints. Once the chromosomes are generated, in an exemplary implementation, crossover operation 404 for one or more of these chromosomes can be performed for creating new solution sets that may be more optimal that the previous possible solutions. Mutation operation 406 can also, in parallel or sequentially, be performed over crossover chromosomes or original chromosomes, wherein the chromosomes can be mutated by combing one or more of the crossover chromosomes/original chromosomes to get improved solutions that represent an improved arrangement and placement of telecommunication equipment and reduced network cost. The steps of crossover operation 404 and mutation operation 406 can be performed for a limited number of iterations or until the optimal chromosomes, which represent a solution set having network cost below a predefined threshold, are obtained. At step 408, the system can obtain an optimal number of chromosomes, which, at step 410, can be used to identify optimal chromosomes(s). In an exemplary implementation, the optimal chromosome(s) represent the number of telecommunication equipment required to meet the given input constraints and their deployment configuration.

Figure 5A:
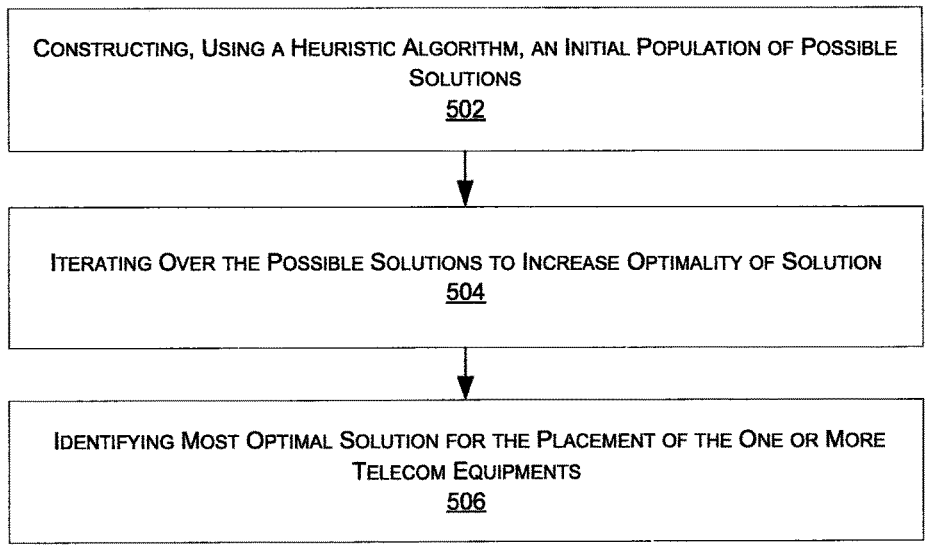
FIGS. 5A and 5B illustrates flow charts of exemplary methods used for determining placement of a network device in accordance with an embodiment of the present disclosure.

FIG. 5A illustrates an exemplary flow diagram 500 of the method used for determining placement of a network device using a heuristic algorithm in accordance with an embodiment of the present disclosure. As show in FIG. 5A, the method to determine placement of one or more telecommunication equipment can include, at step 502, constructing, using a heuristic algorithm, an initial population of possible solutions, and at step 504, iterating over the possible solutions to increase optimality of solution, and at step 506, identifying most optimal solution for the placement of the one or more telecommunication equipment. In an exemplary implementation, at step 502, the method constructs, based on a given network topology and service requirement, using a heuristic algorithm, an initial population of possible solutions, wherein each solution of the possible solutions includes information relating to deployment of the one or more telecommunication equipment. At step 504, the method can iteratively process the possible solutions to increase the optimality of the solution by trying different combinations of the possible solutions and reducing the number of telecommunication equipment or placing one or more telecommunication equipment at different locations. At step 504, optimization of the possible solutions can therefore be performed for a defined number of iterations to increase optimality of solution based on any or a combination of cost of placement of the one or more telecommunication equipment and number of telecommunication equipment to be placed. At step 506, the method can identify the most optimal solution for placement of the one or more telecommunication equipment, wherein the most optimal solution is the one having minimum network cost, for instance. In an exemplary implementation, method 500 of the present disclosure can use any heuristic algorithm selected from one or a combination of simulated annealing, ant colony optimization, tabu search, genetic algorithm, and an evolutionary algorithm.

Figure 5B:
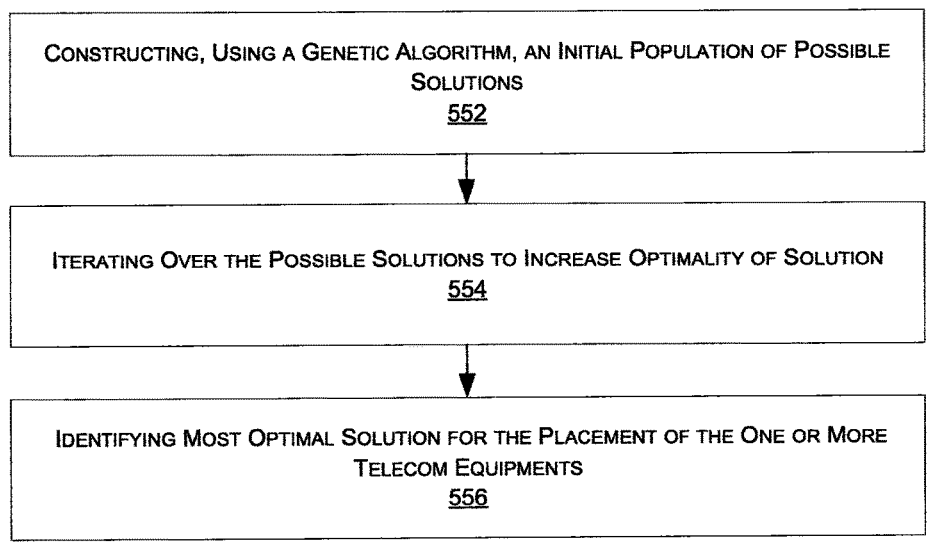

FIG. 5B illustrates an exemplary flow diagram 550 of a method used for determining placement of a network/telecommunication device using genetic algorithm in accordance with an embodiment of the present disclosure. As shown in FIG. 5B, method to determine placement of one or more telecommunication equipment can include the steps of, at step 552, constructing, using a genetic algorithm, an initial population of possible solutions; at step 554, iterating over the possible solutions to increase optimality of solution; and, at step 556, identifying most optimal solution for placement of the one or more telecommunication equipment. In an exemplary implementation, at step 552, method of the present disclosure constructs, based on a given network topology and service requirement, an initial population of possible solutions that are encoded as chromosomes, wherein each solution of the possible solutions can include information relating to deployment of one or more telecommunication equipment. In an exemplary implementation, information of each possible solution can be based on one or a combination of number of telecommunication equipment required, possible locations of the one or more telecommunication equipment, service routes, network topology, capital expenditure, operating expenditure, service require, bandwidth required, protection types for each service, demand, and additional constraints.

At step 554, the method can be configured to iteratively perform crossover and/or mutation operations over one or more chromosomes in order to determine more optimal solutions. At step 554, optimization of solutions can be performed for a defined number of iterations using crossover and mutation operations to increase optimality of solutions based on any or a combination of cost of placement of the one or more telecommunication equipment and number of telecommunication equipment to be placed. At step 556, the method can, based on optimal set of identified chromosomes, identify the most optimal solution for placement of the one or more telecommunication equipment.

In an aspect, methods of present disclosure can be used for determining placement of one or more telecommunication equipment that can be selected from one or a combination of Wavelength Division Multiplexing (WDM) devices, Reconfigurable Optical Add Drop Multiplexer (ROADM) devices, Digital Cross connects, Amplifiers, Regulators, Odd/Even Multiplexers, Power Splitters, Transceivers, VOA, OTN Cross connects, Power supply, OSC, OXC, and other telecommunication devices.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

ADVANTAGES OF THE INVENTION

The present disclosure provides a system and method for determining strategic locations of one or more network device(s) and/or telecommunication equipment(s).

The present disclosure provides a system and method for creating a network design.

The present disclosure provides a system and method for determining placement of network device(s) and/or a telecommunication equipment(s) for different network topology.

The present disclosure provides a system and method for determining placement of network device(s) and/or telecommunication equipment(s) based on or more given network parameters and one or more server requirements.

The present disclosure provides a system and method for creating a network design with minimum number of network devices or telecommunication equipment.

The present disclosure provides a system and method for determining placement of network devices so as to minimize network cost, maximize network utilization, and meets Service Level Agreements (SLA) of given network topology and demand requirements.

We claim:

1. A method to determine placement of one or more telecommunication equipment comprising the steps of:
   constructing, at a computing device, based on given network parameters and service requirements of a network, using a genetic algorithm, an initial population of possible solutions that are each encoded as a chromosome, wherein
   each solution of the possible solutions pertains to a specific deployment of the one or more telecommunication equipment;
   iteratively performing, at said computing device, crossover operations comprising selecting two chromosomes and exchanging features of the two chromosomes to obtain daughter chromosomes as additional possible solutions to increase optimality of the chromosomes, based on a combination of cost of placement of the one or more telecommunication equipment and number of telecommunication equipment to be placed as well as the length of the paths over which traffic is routed; and
   identifying, at the computing device, based on the iterative crossover operations, a most optimal chromosome as a final solution for the placement of the one or more telecommunication equipment to minimize network cost, maximize network utilization, and meet Service Level Agreements (SLA) for a given network topology and demand requirements.

2. The method of claim 1, wherein the information of each possible solution is based on one or a combination of a number of telecommunication equipment required, possible locations of the one or more telecommunication equipment, service routes, network topology, capital expenditure, operating expenditure, service requirements, bandwidth required, protection types for each service, demand, and additional constraints.

3. The method of claim 1, wherein the daughter chromosomes replace less optimal members of the population of possible solutions.

4. The method of claim 1, wherein the two chromosomes are selected at random or based on a defined criterion.

5. The method of claim 1, wherein the step of iterating over the possible solutions comprises conducting, at said computing device, mutation, wherein the step of conducting mutation comprises selecting, at said computing device, a chromosome from the population, and mutating the selected chromosome to obtain a new chromosome that replaces less optimal members of the population of possible solutions.

6. The method of claim 1, wherein the step of iterating over the possible solutions comprises conducting crossing over and mutation for each iteration.

7. The method of claim 1, wherein the step of iterating over the possible solutions is performed for a fixed number of iterations.

8. The method of claim 1, wherein the step of iterating over the possible solutions is performed until a desired optimality threshold is reached.

9. The method of claim 1, wherein the one or more telecommunication equipment are selected from one or a combination of Wavelength Division Multiplexing (WDM) devices, Reconfigurable Optical Add Drop Multiplexer (ROADM) devices, Digital Cross connects, Amplifiers, Regulators, Odd/Even Multiplexers, Power Splitters, Transceivers, Variable Optical Attenuator (VOA), Optical Transport Network (OTN) Cross connects, Power supply, Optical Supervisory Channel (OSC), Optical Cross Connect (OXC), and telecommunication devices.

* * * * *